United States Patent [19]

Stephens

[11] Patent Number: 5,341,639
[45] Date of Patent: Aug. 30, 1994

[54] FULLERENE ROCKET FUELS

[75] Inventor: William D. Stephens, Huntsville, Ala.

[73] Assignee: The United States of America as represented by the Secretary of the Army, Washington, D.C.

[21] Appl. No.: 5,729

[22] Filed: Jan. 19, 1993

[51] Int. Cl.$^5$ ............................................. F02K 9/00
[52] U.S. Cl. ........................................ 60/204; 60/208; 60/209; 60/253
[58] Field of Search ................ 60/200.1, 204, 208, 60/209, 253

[56] References Cited

U.S. PATENT DOCUMENTS

| | | | |
|---|---|---|---|
| H1234 | 10/1993 | Burgner | 60/253 |
| 4,133,173 | 1/1979 | Schadow | 60/204 |
| 4,332,631 | 6/1982 | Herty, III et al. | 60/208 |
| 4,355,663 | 10/1982 | Burkes, Jr. et al. | 60/253 |
| 4,574,586 | 3/1986 | Gabrysch | 60/254 |
| 4,891,938 | 1/1990 | Nagy et al. | 60/254 |
| 5,133,183 | 7/1992 | Asaoka et al. | 60/204 |
| 5,152,136 | 10/1992 | Chew et al. | 60/251 |
| 5,234,475 | 8/1993 | Malhotra et al. | 44/282 |
| 5,239,820 | 8/1993 | Leifer et al. | 60/204 |
| 5,258,048 | 11/1993 | Wherwell | 44/282 |

OTHER PUBLICATIONS

Flood of Fullerene Discoveries Continue Unabated, Jun. 1, 1992, *C&EN*, pp. 25–33, Rudy M. Baum.
The Chemical Properties of Buchminsterfullerene (C$_{60}$) and the Birch and Infancy of Fulleroids, Fred Wudl, *Acc. Chem. Res*, 1992, 25, 157–161.
Fullerences From Geological Environment, Peter R. Buseck et al., *Science*, vol. 257, pp. 215–216, Jul. 1992.

*Primary Examiner*—Richard A. Bertsch
*Assistant Examiner*—Howard R. Richman
*Attorney, Agent, or Firm*—Hugh P. Nicholson; Freddie M. Bush

[57] ABSTRACT

Solid fuel gas generator compositions for use in ducted rockets, in which fullerenes or substituted fullerenes are used. Fullerene compounds in which easily oxidizable groups, oxidizing groups, or salts of oxidizing acids are attached to the spherical carbon skeleton of the fullerene.

6 Claims, 1 Drawing Sheet

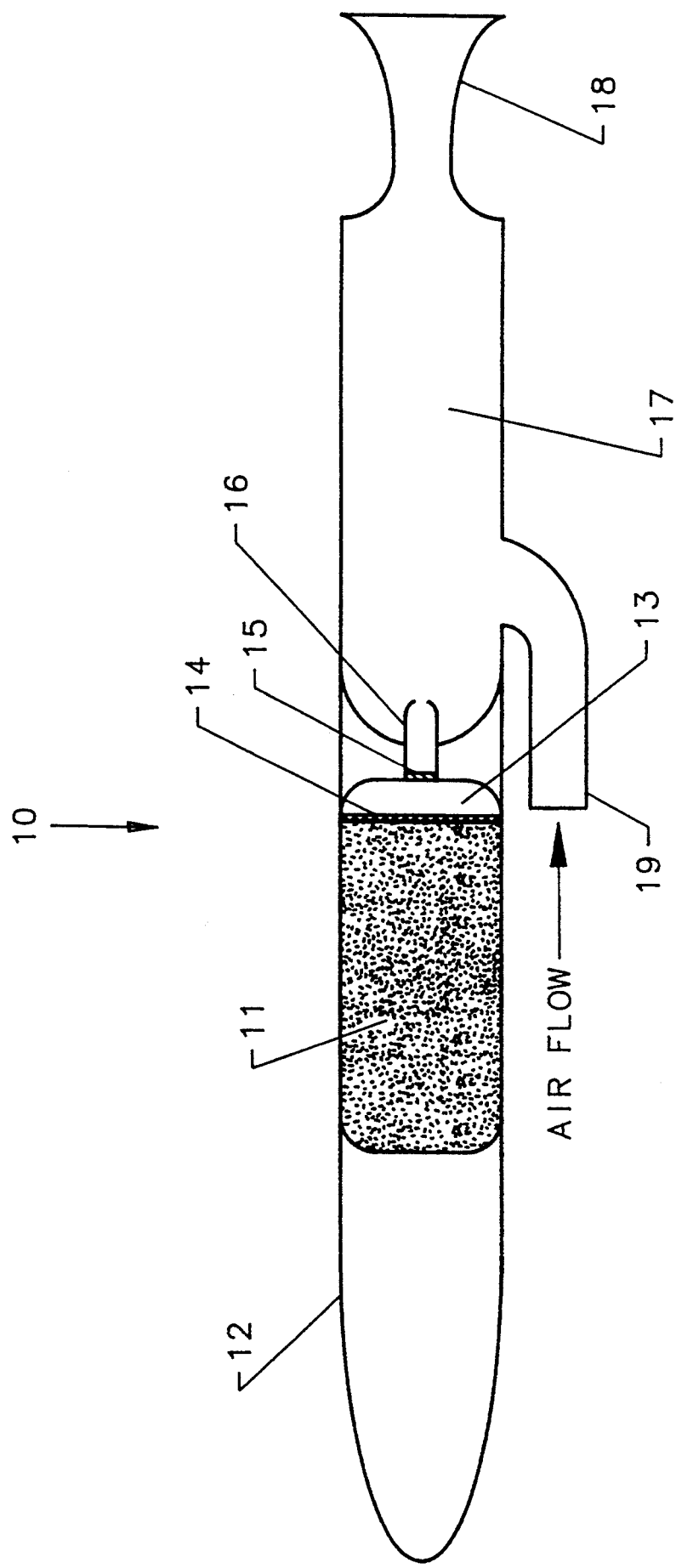

5,341,639

FULLERENE ROCKET FUELS

DEDICATORY CLAUSE

The invention described herein may be manufactured, used, and licensed by or for the Government for governmental purposes without the payment to me of any royalties thereon.

BACKGROUND OF THE INVENTION

Solid rockets are propulsion devices which operate by thrust generated from the combustion of a rocket propellant. Solid rocket propellants are comprised of fuel, oxidizer, and additives. A typical solid rocket propellant has approximately 70 percent solid oxidizer such as ammonium perchlorate, 15 percent metallic fuel such as aluminum powder, 12 percent binder fuel such as polymeric hydrocarbon material, and 3 percent additives. The range, or distance the rocket can travel, is determined by the maximum weight of propellant (or more specifically by the weight of the fuel) which can be loaded into the rocket. It is important to note that in these rockets, 70 percent of the weight of the propellant is oxidizer. The remaining 30 percent is fuel.

If it were not necessary for the rocket to incorporate oxidizer in the propellant along with the fuel, and if it were possible to acquire oxidizer as the rocket moved through the air, then the entire propellant could be replaced by fuel. This would yield substantial increases in the range or distance the rocket can travel.

A ducted rocket is a propulsion device in which an air duct or scoop is attached to the device to acquire the oxidizer (air) during flight. FIG. 1 shows the schematic of a ducted rocket. There are two combustion chambers. In the primary combustion chamber, a solid fuel undergoes a low order, incomplete combustion reaction which generates fuel gases and particles which escape the primary combustion chamber through a valve and injector shown in the figure. The fuel gases which are the products of incomplete combustion in the primary, include combustible materials such as low molecular weight hydrocarbon species, hydrogen, carbon, carbon monoxide, and other oxidizable species. As the gases and particles enter the secondary combustor, ram air is captured by the inlet, and ducted into the secondary combustor to complete the oxidation process. The hot exhaust gases from the secondary combustor exit through the nozzle, producing thrust for the ducted rocket engine.

Fuel for the solid fuel gas generator has been a problem, and has been the subject of several research efforts. In some cases, oxidizers are mixed at low level with hydrocarbon polymeric materials to provide a solid fuel gas generator. In other approaches, energetic binders have been mixed with combustible solid materials to give a solid fuel gas generator. The most energetic solid fuel gas generators use metal particles as a means of obtaining high energy and high density. Examples are magnesium, aluminum, boron, or zirconium powders incorporated in a binder. While these materials generally perform satisfactorily, they generate smoke in the exhaust from the secondary (due to metallic oxide particles such as aluminum oxide), and are generally unsuited for rocket and missile applications in which it is desired to have a smokeless exhaust plume. In these instances, efforts have been made to incorporate carbon in various forms as a solid additive in the composition of the solid fuel gas generator. Carbon has been known to exist in two pure forms, diamond and graphite, and a number of impure forms, such as coal or soot. Previous experience has shown that solid fuel gas generators in which carbon is included have two main problems. The first problem is that the inclusion of carbon in the solid fuel gas generator introduces particles which must be ejected into the secondary chamber. This is an energy absorbing process which tends to decrease the burning rate of the solid fuel in the gas generator. The second problem is the difficulty in getting carbon to burn once it has entered the secondary combustion chamber. The difficulty in getting complete combustion of the carbon results in extraordinarily long residence times in the secondary combustor in order to get the carbon completely burned.

Therefore, the current status of the art in formulating solid fuel gas generator composition for a ducted rocket (or for other rocket applications) is to attempt to use baffles in the secondary combustion, swirl generation engineering approaches, or simply to build an extraordinarily long combustion chamber.

Therefore, a primary object of this invention is to provide a solution to the problem of complete combustion of carbon in a ducted rocket, or the rocket application, meanwhile retaining the smokelessness inherent in the use of carbon, and the high density available.

SUMMARY OF THE INVENTION

This invention involves a process for achieving high efficiency in the operation of a ducted rocket by the use of a new form of carbon, $C_{60}$, known as fullerene, derivatives of fullerene, and other members of the class of fullerene compounds or their derivatives.

The advantages of these materials are that they constitute a form of carbon which will evaporate or sublime quite easily by comparison to particles of diamond or graphite. The fullerene, or derivatives of fullerene, exist as molecules which are relatively volatile by comparison with other forms of carbon. These materials are solids, and therefore easily compounded in solid fuel gas generator compositions. They have low molecular weights (low when compared to particulates) which helps in volatility, and have a fairly high density (compared to other organic solids). In addition, the fullerenes can be modified easily to adjust the oxidation susceptibility, so that the residence time in a secondary combustor can be shortened.

BRIEF DESCRIPTION OF THE PREFERRED EMBODIMENT

The Figure of the Drawing depicts a schematic diagram of an extended range ducted rocket having a rocket motor case and nozzle, air duct/inlet, a primary combustor with a solid fuel gas generator disposed therein, igniter means for the solid fuel gas generator, a secondary combustor and associated valve and injector for transferring hot fuel gases from the primary combustor to the secondary combustor.

DESCRIPTION OF THE PREFERRED EMBODIMENTS

The solid fuel gas generator compositions of this invention are comprised of an energetic binder such as a polymeric hydrocarbon or oxygenated polymer which has oxidizing groups such as nitro, nitrato, nitramine, perchlorate, or azide attached to the polymer, along with carbon in the form of fullerenes or their derivatives.

The fullerenes used in this invention would include the parent members of the series, as well as, members of three other classes of derivatives 1) fullerenes with easily oxidizable groups attached; 2) fullerene amines as salts of oxidizing acids; and 3) fullerenes with oxidizing groups attached. Using the $C_{60}$ fullerene as an example, easily oxidizable groups may be attached to the fullerene in order to facilitate its combustion in a shorter length in the secondary combustor. Examples of easily oxidizable groups are alkyl, alkylene, acetylenic, alcohol, amine, hydrazine, mercaptan, sulfide, disulfide, or aldehyde groups.

A second class of fullerene derivatives is illustrated by salts of fullerene amine derivatives compounded with oxidizing acids. One such example would be $C_{60}NH_2 \cdot HNO_3$. Other oxidizing acids which provide examples of these salts include $C_{60}$ amine salts of perchloric acid. Examples are $C_{60}NH_2 \cdot HCLO_4$ and $C_{60}C_2H_4NHHClO_4$.

A third class of fullerene derivatives is the class in which oxidizing groups are attached directly to the fullerene cage structure or are attached through some intermediate group. Examples are nitrofullerene, $C_{60}NO_2$, fullerene azide, $C_{60}N_3$, as well as other fullerene derivatives containing radicals selected from nitrato, nitramine, chlorate, perchlorate, or nitrate.

In further reference to the single figure of the drawing, a ducted rocket 10 is illustrated with a solid fuel gas generator composition 11 housed within a rocket motor case 12 and a region designated as a primary combustor 13. An igniter 14 is employed to initiate combustion of the solid fuel gas generator composition 11. The burning solid fuel gas generator composition discharges hot fuel gases and partial decomposition products through valve 15 and injector 16 into the secondary combustor 17. In flight the air duct/inlet 19 introduces oxygen from the air into the secondary combustor for complete combustion of the hot fuel gases and partial decomposition products from the primary combustor. The discharge of the complete combustion products from the secondary combustor through nozzle 18 provides thrust.

The use of solid fullerenes in the solid fuel gas generator composition because of their relative volatility, low molecular weight compared to particulates, and fairly high density compared to other organic solids, results in a higher rate of hot fuel gases generation from the primary combustor for subsequent hypergolic reaction with oxygen scooped in from the air thereby promoting efficient burning of the hot fuel gases and partial decomposition products in the secondary combustor, and thereby allowing a shorter design for the secondary combustor.

The fullerenes are advantageously employed in the solid fuel gas generator composition of the primary combustor since the fullerenes can be modified easily to adjust the oxidation susceptibility, so that the residence time in the secondary combustor can be shortened thereby allowing a greater proportion of the engine length to be used for gas generator, resulting in greater range for the rocket.

Two commonly assigned inventions to the United States of America as represented by the Secretary of the Army disclose a solid fuel gas generator composition of a preferred composition of glycidly azide polymer known as GAP. These inventions were issued as U.S. Pat. No. 5,133,183, titled: Gel/Solid Bipropellant Propulsion System with Energy Management Capability, to Asaoka et al on Jul. 28, 1992, and as U.S. Pat. No. 5,152,136, titled: Solid Fuel Ducted Rocket (Gel-Oxidizer Augmentation) Propulsion, to Chew et al on Oct. 6, 1992.

The usefulness of fullerenes as a contributor to gas generation in a solid fuel gas generator as combined in a ducted rocket wherein the fullerenes further contribute to the total efficiency of a ducted rocket by adjusting the oxidation susceptibility of the hot fuel gases and partial decomposition products discharged into the secondary combustor to decrease resident time in the secondary combustor and to achieve a major advance in rocket propulsion. The acquiring of oxygen from the air as the rocket moves through the air enables the entire propellant system to be in the form of fuel. Eliminating the weight of about 70 percent of oxidizer translates to a substantial increase in the range or distance that the rocket can travel.

While the present invention has been described by specific embodiments thereof, it should not be limited thereto, since obvious modifications will occur to those skilled in the art without departing from the spirit of the invention or the scope of the following claims.

I claim:

1. In the method of operation of a ducted rocket comprising a primary combustor containing a solid fuel gas generator for supplying hot fuel gases and partial decomposition products for combining with oxygen acquired from air during flight for producing complete combustion products in a secondary combustor and discharging combustion gases through a nozzle to provide thrust for said ducted rocket, the improvement in said method of operation of said ducted rocket for achieving high efficiency in the operation of said ducted rocket comprising incorporating into a solid fuel gas generator composition a solid fuel selected from the group consisting of fullerenes having a cage structure and derivatives of fullerenes having a cage structure.

2. The method for achieving high efficiency in the operation of said ducted rocket as defined in claim 1 wherein said solid fuel gas generator is comprised of an energetic binder selected from a polymeric hydrocarbon and an oxygenated polymer having oxidizing groups selected from nitro, nitrate, nitramine, perchlorate, and azide attached thereto, and wherein said solid fuel fullerenes having a cage structure has a $C_{60}$ cage structure and wherein said derivatives of solid fuel fullerenes having a cage structure has a $C_{60}$ cage structure.

3. The method for achieving high efficiency in the operation of said ducted rocked as defined in claim 2 where said solid fuel fullerenes having a $C_{60}$ cage structure has an attached easily oxidizable group selected from the group consisting of alkyl, alkylene, acetylenic, alcohol, amine, hydrazine, mercaptan, sulfide, disulfide, and aldehyde groups, said solid fuel fullerenes having a $C_{60}$ cage structure with said attached easily oxidizable group being solid fuel fullerenes derivatives.

4. The method for achieving high efficiency in the operation of said ducted rocket as defined in claim 3 wherein said solid fuel fullerenes derivatives are salts of fullerenes amine derivatives compounded with an oxidizing acid selected from nitric acid and perchloric acid.

5. The method for achieving high efficiency in the operation of said ducted rocket as defined in claim 2 wherein said solid fuel fullerenes having a $C_{60}$ cage structure has an oxidizing group attached directly to said solid fuel fullerenes $C_{60}$ cage structure.

6. The method for achieving high efficiency in the operation of said ducted rocket as defined in claim 2 wherein said solid fuel fullerenes having a $C_{60}$ cage structure has an oxidizing group attached through an intermediate group to said fullerenes $C_{60}$ cage structure.

* * * * *